March 15, 1938. J. R. MEYERS 2,111,051
CHEESE PACKAGE
Filed June 25, 1936
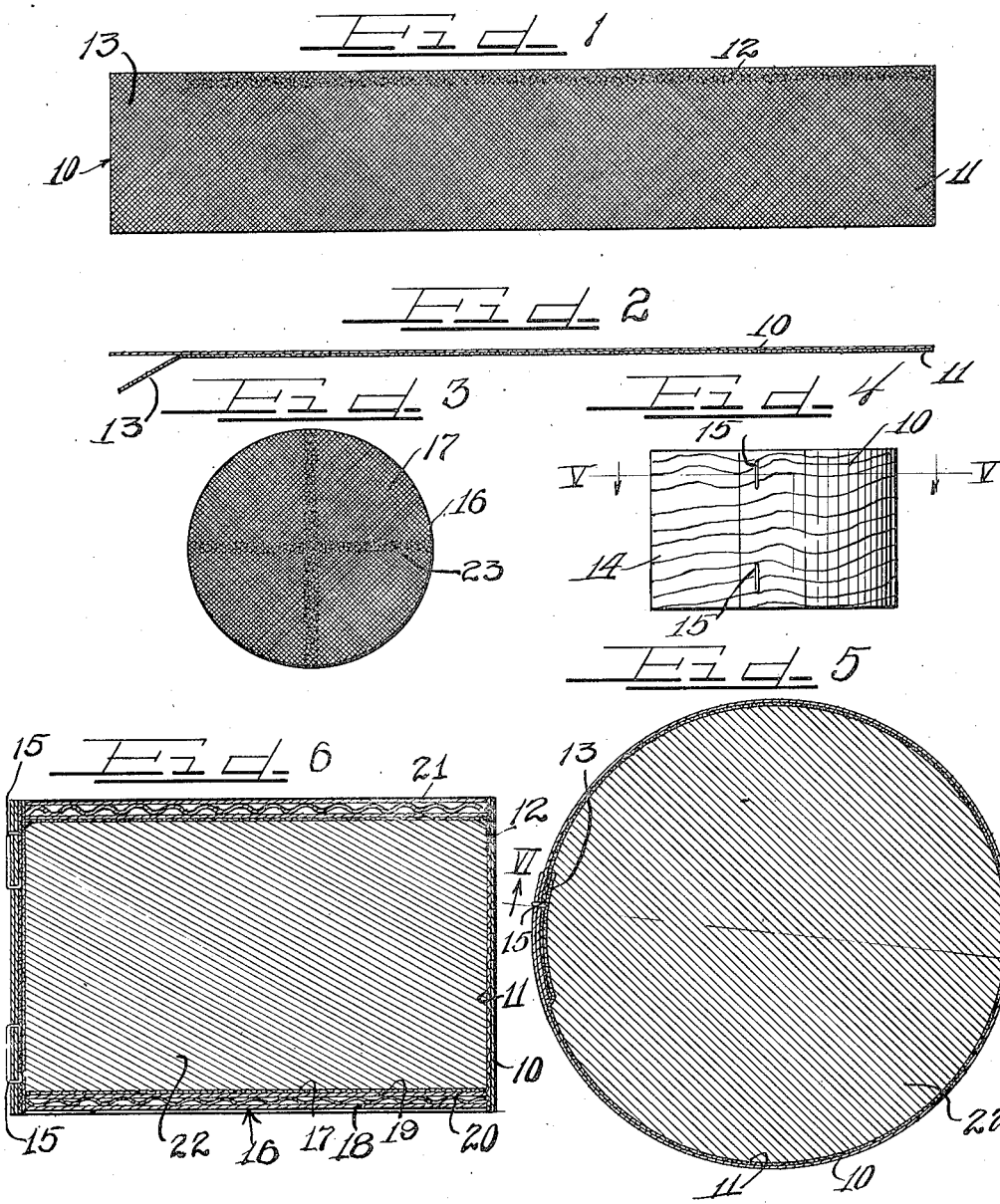

Patented Mar. 15, 1938

2,111,051

UNITED STATES PATENT OFFICE 2,111,051

CHEESE PACKAGE

Julius R. Meyers, Sheldon, Wis.

Application June 25, 1936, Serial No. 87,181

4 Claims. (Cl. 206—46)

This invention relates to a cheese package.

It has heretofore been proposed to package cheese in various types of wrappers, such as metal foil, transparent sheets of regenerated cellulose, cellulose acetate, or the like, and in foil lined cartons. Metal foil wrappers, which are probably most generally used, are fairly satisfactory, but relatively expensive and somewhat objectionable because of the tendency of the metal foil to adhere closely to the cheese, so that it can be removed only with difficulty.

It is therefore one of the objects of the present invention to obviate the use of metal foil in the wrapping of cheese and to substitute therefor a container formed from wood veneer and lined with cheese cloth or the like. Such a container has the advantage that it is comparatively inexpensive and may be readily and simply formed by overlapping and stapling together the ends of a strip of wood veneer, lightly pasting a cheese cloth liner over the inner surface of the cylinder so formed and press fitting therein a bottom closure member. The ends of the veneer strip are secured in such a way that the seam can be readily broken when it is desired to remove the cheese. The cloth liner prevents the cheese from sticking unduly to the surface of the wood veneer.

It is a further important object of this invention to provide a cloth lined container of wood veneer for receiving the cheese while in a flowable condition to serve as a mold therefor and also for use, without further wrapping, as a shipping and storage container for the cheese until it reaches the ultimate consumer.

It is a further important object of this invention to provide a cylindrical container for cheese, the body portion of which is formed from a strip of wood veneer lined with cheese cloth or the like, with the ends of the wood veneer strip stapled together in such a way that they can be readily separated and the cheese cloth liner stripped as desired from the block of cheese to place the cheese in condition for serving.

It is a further important object of this invention to provide a method of making a packaged cheese, which includes forming a cylinder from a strip of wood veneer by overlapping the ends thereof and lightly stapling said ends together, providing a cheese cloth liner or the like to cover the entire surface of such cylinder and overlie the joints thus formed, force fitting a lined bottom closure disc into said cylinder and, after the cheese has been poured thereinto, closing the upper end thereof by means of a cloth lined disc press fitted thereinto.

Other and further important objects of this invention will be apparent from the disclosures in the specification and the accompanying drawing.

This invention (in a preferred form) is illustrated in the drawing and hereinafter more fully described.

On the drawing:

Figure 1 is a plan view of a strip of wood veneer having lightly pasted thereto a liner of cheese cloth or the like.

Figure 2 is a longitudinal sectional view of the strip of Fig. 1, showing one end of the cheese cloth liner free and extending away from the strip wood veneer.

Figure 3 is a plan view of a closure disc having a cloth lining.

Figure 4 is an elevational view of the wood veneer strip formed into a cylinder by stapling together its overlapping ends.

Figure 5 is an enlarged sectional view of a finished package of cheese taken substantially along the line V—V of Fig. 4.

Figure 6 is a sectional view taken substantially along the line VI—VI of Fig. 5.

As shown on the drawing:

The reference numeral 10 indicates generally a strip of wood veneer, rectangular in shape and of suitable thickness, depending upon the size of the package desired. Said wood veneer strip 10 is preferably provided with a liner 11 of an open mesh cloth, such as cheese cloth, "factory" cloth, or the like. It is satisfactory to use the usual type of starched cheese cloth which is readily available on the market.

Said strip of cheese cloth 11 is preferably adhesively secured to the wood veneer strip 10 along one of its edges, as at 12. For this purpose a paste of flour and water, so called "library" paste, or other substantially tasteless and inocuous adhesive may be used. The band of adhesive 12, however, terminates short of one end of the strip to leave a free end 13 of the liner, for a purpose that will later appear. It is not, of course, essential that the liner be secured to the wood veneer strip along only one of its edges, or even along a continuous band of the strip, but preferably the liner 11 is rather lightly pasted to the wood veneer strip 10 so that the two can be readily separated when opening the package to use the cheese.

The cloth lined wood vener strip 10 is next formed into an open ended cylinder 14 (Fig. 4)

by overlapping the ends of said strip and passing staples 15 through said ends of the wood veneer strip and through the attached end of the liner 11. During the stapling operation, the free end 13 of the liner is folded away from the joint so that the staples will not pass through it, but only through the overlapping ends of the veneer and the one thickness of the liner. After the overlapping joint has been stapled, the free end 13 of the liner is made to overlie the joint and conform to the inner contour thereof, as indicated in Fig. 5. Alternatively, the liner 13 may be pasted in place after the cylinder 14 has been preformed.

The reference numeral 16 indicates one of a pair of similar closure discs, suitably formed of fiber board or the like and provided with an inner surface liner 17 of cheese cloth. The diameter of the closure disc 16 is such that it can be force fitted into the cylinder 14 and be held therein by frictional engagement alone. In the form of closure disc illustrated in Figs. 3 and 6, the disc 16 comprises a pair of fiber board discs 18 and 19 with a disc 20 of corrugated board adhesively secured therebetween. The cloth liner 17 may be lightly secured to said disc 16 along paste lines 23, or may be separate if desired.

A disc 16 to form the bottom closure of said open ended cylinder 14 is forced into place. It will be noted that said disc 16 serves also to engage and hold tight the free lower margin of the cheese cloth liner 11, the pasted margin 12 being at the top of the cylinder 14. Thereafter the cheese in a pasteurized and heated, flowable condition is poured into the cylinder 14 to substantially fill the same. After the cheese, indicated by the reference numeral 22, has been poured in, a second disc 16 is force fitted over the cheese into the open end of the cylinder 14 to provide a top closure 21.

As the cheese is poured into the container in the manner described, the cheese flows into the open meshes of the cloth liners and into contact with the wood veneer surface and the inner surfaces of the closure discs, thereby completely sealing any joints. The package is thus substantially air tight, although sufficiently permeable to permit any carbon dioxide gas, that might be formed during any further curing of the cheese, to find its way out of the container. It is nevertheless impossible for air from the outside to get at the cheese and form a rind or dry out the surface of the cheese, with the result that the entire cheese is usable.

In order to use the cheese, it is simply necessary to remove the staples 15, or otherwise rupture the joint formed by them, unwrap the wood veneer strip 10 and strip the liner 11 from the surface of the cheese to the extent desired. The liner may be left attached to the unused part of the block of cheese pending total consumption. The discs 16 and 21 do not stick to the cheese block by reason of their cloth liners and may be readily lifted off of the block or vice versa and the disc or cap cloth liners 17 left in place to protect the cheese.

One considerable advantage of the container of my invention is that it is relatively inexpensive and can be formed to receive the cheese either by hand operation or by automatic machinery in a very simple fashion. The use of the container as a mold for poured or cast cheese, as well as its use as the final receptacle until the cheese reaches the ultimate consumer, represents a saving in labor and material over the usual manner of handling and packaging cheese.

It will be understood that the package of my invention may be used in connection with any suitable type of processed or pasteurized cheese. The natural flavor, taste and moisture content of the cheese is preserved in a package such as described practically indefinitely.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A cheese package comprising a cylinder of wood veneer having a stapled lap joint, a cloth liner for said cylinder lightly pasted to the inner surface thereof and having a free end overlying said stapled lap joint and cloth lined closures for said cylinder.

2. A cheese package comprising a cylinder of wood veneer having a stapled lap joint, a cheese cloth liner for said cylinder lightly pasted to the inner surface thereof along one edge only and having a free end overlying said stapled lap joint and cheese cloth lined closures for said cylinder.

3. A cheese package comprising a cylinder formed of a strip of wood veneer having its ends overlapping, staples holding said overlapped ends together, a cheese cloth liner for said wood veneer strip having one of its ends held by said staples and having its other end overlapping its secured end, and cheese cloth lined closure discs for said cylinder ends.

4. A cheese package comprising a cylinder formed of a strip of wood veneer having its ends overlapping, a cloth liner coextensive with and lightly pasted to the inner surface of said wood veneer strip, light staples securing together said overlapping ends and one end of said liner, the free end of said liner overlying the secured end and closure discs for the ends of said cylinder.

JULIUS R. MEYERS.